2,539,393

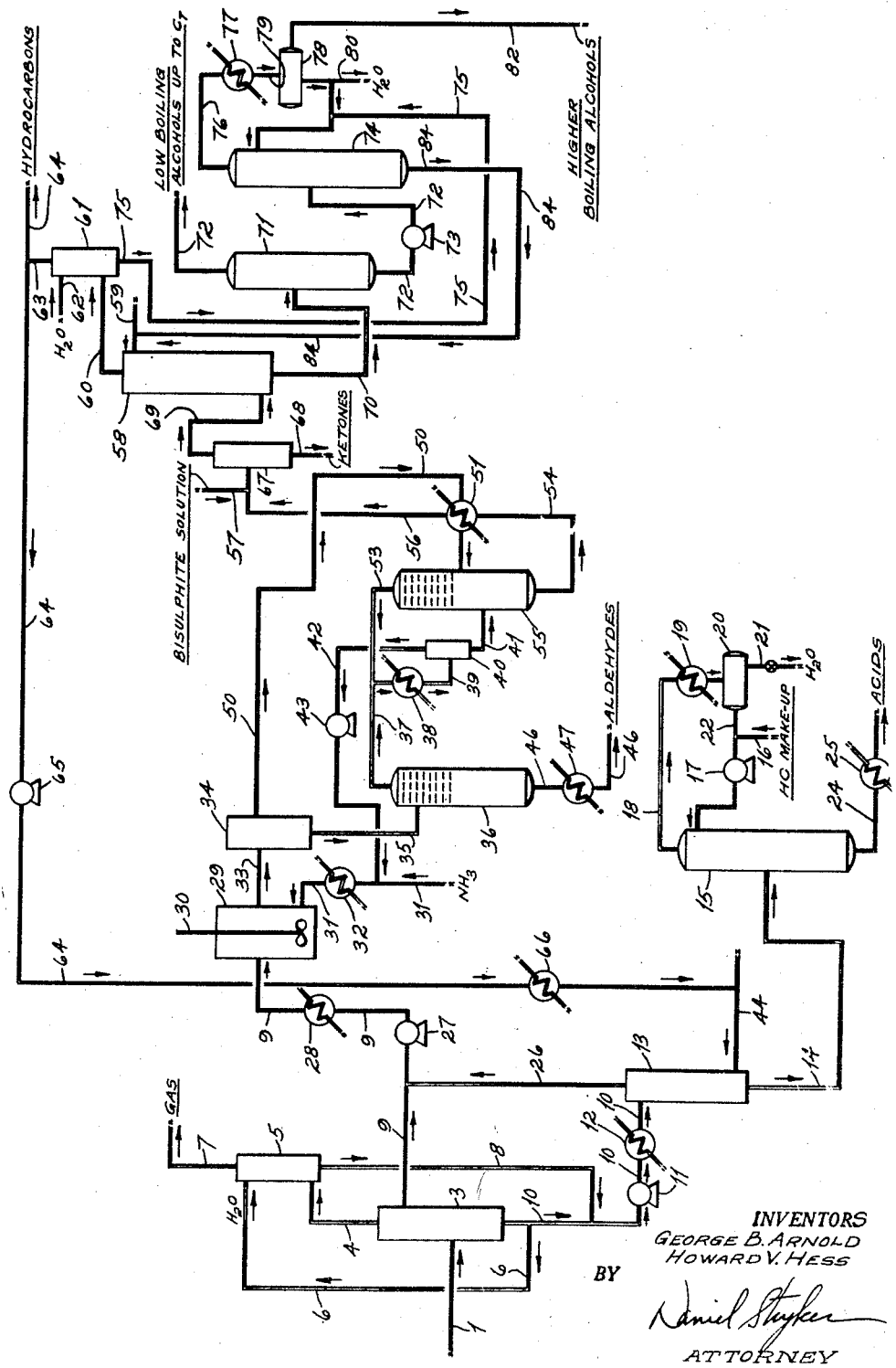
Jan. 30, 1951     G. B. ARNOLD ET AL     2,539,393
METHOD FOR THE SEPARATION OF A HETEROGENEOUS
MIXTURE OF COMPOUNDS
Filed Jan. 18, 1947
INVENTORS
GEORGE B. ARNOLD
HOWARD V. HESS
BY
Daniel Stryker
ATTORNEY Patented Jan. 30, 1951

UNITED STATES PATENT OFFICE 2,539,393

METHOD FOR THE SEPARATION OF A HETEROGENEOUS MIXTURE OF COMPOUNDS

George B. Arnold, Glenham, N. Y., and Howard V. Hess, Charleston, W. Va., assignors to The Texas Company, New York, N. Y., a corporation of Delaware Application January 18, 1947, Serial No. 722,844

2 Claims. (Cl. 260—450)

This invention relates to the resolution of a heterogeneous mixture of compounds comprising oxygen-containing organic compounds, water, hydrocarbons and gases into its components.

In accordance with the invention, a heterogeneous mixture comprising normally gaseous compounds, liquid hydrocarbons, water and oxygen-containing organic compounds, including aldehydes, ketones, alcohols and acids, such as obtained by catalytic conversion of carbon monoxide and hydrogen, is separated into a gas phase, a liquid hydrocarbon phase and an aqueous phase. Both of the latter two phases contain substantial quantities of oxygen-containing organic compounds. The aqueous phase is extracted with a hydrocarbon solvent at elevated temperature and at a pressure sufficient to maintain substantially liquid phase conditions so as to form a water-rich phase containing low molecular weight organic acids and a hydrocarbon-rich extract phase containing non-acidic oxygenated organic compounds and high molecular weight acids. The organic acids are readily recovered from the water-rich phase. The hydrocarbon extract phase is combined with the liquid hydrocarbon phase initially separated from the heterogeneous mixture and the combined phases are subjected to treatment with ammonia at elevated temperature and at a pressure sufficient to maintain substantially liquid phase conditions, thereby effecting substantially complete removal of aldehydes in the form of aldehyde-ammonia complexes from which aldehydes are regenerated in the monomeric form. As a result of such ammonia treatment, there remains a hydrocarbon phase containing non-acidic, non-aldehydic oxygen-containing compounds which comprise alcohols, ketones and esters. Ketones are selectively removed from such a hydrocarbon mixture by treatment with concentrated bisulphite solution whereby there are formed ketone-bisulphite addition compounds which separate from the hydrocarbon solution. Thereafter the hydrocarbon solution of non-acidic and non-carbonylic oxygen-containing compounds is subjected to secondary extraction with a hydrocarbon-immiscible solvent, such as ethylene glycol, so as to form a secondary hydrocarbon-rich phase in which the retained oxygen-containing organic compounds consist mainly of esters, and a secondary solvent-rich extract phase containing alcohols. Alcohols are readily separated from the secondary solvent-rich extract phase by fractionation or steam distillation. The secondary hydrocarbon-rich phase can be freed of esters by treatment with alkali, preferably at elevated temperatures, whereby the esters are saponified to form alcohols and water-soluble alkaline salts of organic acids. The organic acid salts thus formed are removed from the hydrocarbon phase by aqueous extraction while the alcohols may be separated therefrom by solvent extraction.

In further description of the invention and in the claims, the term "carbonyl group" will be used to denote aldehydes and ketones exclusively. It is recognized that under some aspects, organic acids and esters may be considered to have a modified carbonyl group, but in order to simplify description such compounds will not be considered to possess a carbonyl group as the term is hereafter used.

The invention comprises an integrated process whereby a heterogeneous mixture containing oxygen-containing organic compounds, water, hydrocarbons and normally gaseous components is treated so as to effect isolation of organic acids into one fraction, aldehydes into another fraction, ketones into another fraction and substantially all the alcohols into yet another, thereby leaving a water phase and hydrocarbon phase, both of which are substantially free from oxygen-containing organic compounds. Once the mixture has been divided into fractions according to classes of compounds, the isolation of individual constituents of each class of compounds is readily effected by close fractionation.

The catalytic conversion of carbon monoxide and hydrogen ordinarily results in a heterogeneous mixture of products and the invention is of particular application in the treatment of the products of such conversion so as to separate the various products according to classes. As an exemplification of the complex mixture produced by the conversion of synthesis gas, a synthesis operation using a synthesis catalyst of the iron type and directed towards the production mainly of gasoline hydrocarbons, produces about two volumes of water per volume of liquid hydrocarbon phase; both the liquid hydrocarbon phase and the aqueous phase contain considerable dissolved oxygen-containing compounds which are mainly alcohols having from two to twenty carbon atoms per molecule. There is also present in the product mixture substantial quantities of aldehydes, acids and esters, plus minor quantities of ketones. These compounds are distributed between the aqueous phase and the liquid hydrocarbon phase primarily on the basis of molecular weight which is to say that the lower molecular weight compounds are present in the aqueous phase and the higher molecular weight compounds are dissolved in the liquid hydrocarbon phase. The present invention is designed to provide means for recovering these compounds both from the liquid hydrocarbon phase and the aqueous phase at the lowest cost.

The recovery of the various compounds present in a heterogeneous mixture, such as produced by the catalytic conversion of synthesis gas, is important for two reasons: first, various oxygen compounds are economically important in their own right; secondly, their presence in the hydrocarbon phase is usually undesirable.

It has been discovered that non-acidic oxygen-containing compounds are effectively displaced from the aqueous phase into the hydrocarbon layer of a hydrocarbon-water system at about 200 to 275° F. For example, when the product mixture from a typical synthesis operation directed mainly toward the production of hydrocarbons boiling in the gasoline range is separated at about 100° F. into aqueous and hydrocarbon phases respectively, the aqueous phase contains about 7% by weight oxygen compounds dissolved therein. On the other hand, if the phase separation is made at about 300° F., the resulting water phase contains only about 2% oxygen compounds, and these compounds are mainly low molecular weight organic acids and ethyl alcohol. At least a large portion of the organic acids produced in the conversion are retained in the separated aqueous phase.

Anhydrous liquid ammonia or concentrated aqueous ammonia containing about 20 to 28 per cent ammonia by weight may be used to effect removal of the aldehydes from the hydrocarbon solution of oxygen compounds. Substantially complete removal of aldehydes is effected at temperatures in the range of 200 to 400° F., and at pressures in the range of 300 to 500 pounds per square inch pressure. After such treatment, the hydrocarbon solution gives a negative test with Schiff's reagent.

One of the features of the invention is that aldehydes are almost completely removed from the hydrocarbon solution in the form of ammonia complexes and are recovered in the monomeric form by dissociating the complexes with heat. In other words, aldehydes are recovered without substantial polymerization.

The ammonia treatment will also remove as ammonium salts residual organic acids which are present in the hydrocarbon solution, such acids being of higher molecular weight than those remaining in the water phase, and effect partial conversion of esters present to ammonium salts and alcohols. $C_2$ and $C_3$ acids are mainly found in the water phase while $C_4$ and higher acids are found in the hydrocarbon phase. The aldehydes may be separated from ammonium salts of organic acids by azeotropic distillation with water.

In order that the invention may be more completely described, reference will now be made to the accompanying drawing in which the method of flow of the complete integrated process is outlined.

The charge to the process advantageously comprises a synthesis product mixture obtained by subjecting synthesis gas containing carbon monoxide and hydrogen to contact with a synthesis catalyst of the iron type at a temperature of about 600 to 650° F. and under a pressure of about 200 to 250 pounds per square inch gauge. The synthesis product mixture may comprise about two liquid volumes of water to one volume of organic compounds, the latter comprising hydrocarbons and oxygen-containing compounds. The oxygen-containing compounds may amount to from 5 to 20 volume per cent of the non-aqueous normally liquid compounds. The non-aqueous, non-hydrocarbon portion of a typical synthesis product was found to have the following approximate composition:

| | |
|---|---|
| Alcohols | 80–20 |
| Acids | 10–25 |
| Esters | 5–40 |
| Aldehydes | 3–8 |
| Ketones | 2–7 |

The synthesis product mixture, after cooling to a temperature of about 100° F., is conducted through a pipe 1 into a separator 3. In the separator 3, there is effected partition of the heterogeneous mixture into three phases: a gas phase comprising the normally gaseous components of such a mixture which are carbon dioxide, low boiling hydrocarbons, carbon monoxide and hydrogen; a liquid hydrocarbon phase containing dissolved therein aldehydes, ketones, alcohols, organic acids and esters; an aqueous phase containing dissolved therein aldehydes, ketones, alcohols, organic acids and esters. The aqueous phase contains mainly oxygen compounds containing less than six carbon atoms per molecule. The oxygen compounds in the hydrocarbon phase are mainly those having six or more carbons per molecule.

The gas phase leaves the separator 3 through a pipe 4 and is introduced into a scrubber 5 wherein it is subjected to countercurrent contact with water introduced into the scrubber 5 through a pipe 6. A portion of the aqueous phase is advantageously employed to effect scrubbing of the gas phase. Countercurrent contact with water in the scrubber 5 removes entrained low boiling oxygenated compounds, such as acetaldehyde, from the gas stream. Washed gas substantially free from entrained oxygenated compounds leaves the scrubber 5 through a pipe 7. The water wash is removed from the scrubber 5 through a pipe 8 and combines with the water phase separated from the heterogeneous mixture.

The washed gas is advantageously recycled at least in part to the conversion unit, not shown, where in synthesis gas is converted to hydrocarbons, oxygen-containing compounds and the like.

The liquid hydrocarbon phase leaves the separator 3 through a pipe 9. Further treatment of this phase will be described more in detail later.

The aqueous phase is withdrawn from the lower portion of the separator 3 through a pipe 10. The aqueous phase is raised to a pressure of about 250 pounds per square inch and a temperature of about 200° F. in a pump 11 and an exchanger 12, respectively, in the line 10. The aqueous phase is introduced into an extraction tower 13 which is advantageously packed with contact material.

In the extraction tower 13, the aqueous phase is subjected to countercurrent contact with a hydrocarbon solvent such as naphtha, introduced therein through a pipe 44 at about 200° F. and about 250 pounds per square inch. About 1 to 2 volumes of naphtha are used per volume of aqueous phase. Under these conditions, non-acidic oxygen compounds are extracted from the aqueous phase. There are formed a hydrocarbon-rich extract phase containing the major share of the non-acidic oxygen compounds and a water-rich phase containing mainly low molecular weight organic acids and ethyl alcohol. Ethyl alcohol and other residual low-boiling oxygen compounds can be flashed from the water-rich phase in the form of aqueous azeotropes in a flash tower, not shown.

The water-rich phase containing organic acids is withdrawn from the extraction tower 13 through a pipe 14 and is then introduced into a fractionating tower 15 into which there is also introduced a hydrocarbon fraction, such as naphtha, through a pipe 16 and a pump 17. Water is distilled from the organic acids in the form of a hydrocarbon-water azeotrope in the tower 15. The hydrocarbon-water azeotrope leaves the tower 16 through a pipe 18 and is condensed in an exchanger 19 and is then introduced into a settler 20. Water is withdrawn from the settler 20 through a pipe 21. The hydrocarbon upper layer is withdrawn from the settler 20 through a pipe 22 and therethrough returned to the extraction tower 15 as an azeotrope maker. A mixture of organic acids comprising mainly low boiling acids such as acetic, propionic and butyric is removed from the tower 16 through a pipe 24 and is cooled in an exchanger 25. The individual acids may be obtained from this mixture by fractional distillation.

The hydrocarbon-rich extract phase containing non-acidic oxygen compounds originally present in the aqueous phase leaves the extraction tower 13 through a pipe 26. This extract phase combines in the pipe 9 with the hydrocarbon phase initially separated from the heterogeneous mixture and the combined hydrocarbon phases are raised to an elevated pressure of about 500 pounds per square inch in a pump 27. The combined hydrocarbon phases, containing almost all the non-acidic oxygenated compounds produced in the conversion, are raised to a temperature of about 200° F. in an exchanger 28 through which the pipe 9 passes. The combined hydrocarbon phases are introduced into a mixer 29 which is maintained at a temperature of about 200° F. and at a pressure of about 500 pounds per square inch. The mixer 29 is provided with means for thoroughly agitating the introduced components which means are exemplified in the drawing by a stirrer 30.

Liquid ammonia, obtained from a source not shown through a pipe 31, is introduced into the mixer 29 at a pressure of about 500 pounds per square inch and at a temperature of 200° F. which it attains in an exchanger 32. Ammonia and the hydrocarbon solution of oxygenated organic compounds are thoroughly agitated in the mixer 29 with the resulting formation of aldehyde-ammonia complexes. As a result of this treatment, there are also formed ammonium salts of higher molecular weight acids which were dissolved in the hydrocarbon phase initially separated from the heterogeneous mixture.

Either anhydrous ammonia or a concentrated aqueous solution containing about 25 per cent ammonia by weight may be used to effect the removal of aldehydes from the hydrocarbon solution. Anhydrous or substantially anhydrous ammonia is a preferred reactant because its use reduces by one-third the amount of reagent that has to be handled and further because there is less tendency for low boiling alcohols present in the hydrocarbon solution to dissolve in anhydrous ammonia than in concentrated aqueous solution. In further description of the process, it will be assumed that liquid anhydrous ammonia has been used to effect the removal of aldehydes.

The quantity of ammonia used depends upon the concentration of aldehydes and acids present in the hydrocarbon solution. There is employed a 10 to 50 per cent excess of ammonia over and above the stoichiometric quantity of ammonia required to react with the aldehydes and the acids present to form ammonia complexes and ammonium salts respectively. In operation, a rough quantitative estimate of the aldehyde and acid concentration is made and usually about a 15 per cent excess of ammonia over the stoichiometric amount calculated from this estimate is employed.

The reaction mixture leaves the mixer 29 through a pipe 33 and is introduced into a settler 34. Therein the mixture separates into two phases: an upper hydrocarbon layer containing non-aldehydic, non-acidic oxygen compounds which are mainly alcohols in addition to a small quantity of ketones and esters; a lower viscous oily layer containing excess ammonia, aldehyde-ammonia complexes and ammonium salts of organic acids.

In place of the settler 34, a centrifuge may be used to separate the aldehyde-ammonia complexes from the hydrocarbon solution of oxygenated compounds.

The lower layer is withdrawn from the settler 34 through a pipe 35 and is introduced into a stripper 36 wherein the lower layer containing aldehyde-ammonia complexes is subjected to a temperature of about 350° F. at atmospheric pressure. The aldehyde-ammonia complexes are decomposed under these conditions with liberation of ammonia. Ammonia is removed from the stripper 36 through a pipe 37. There may also be entrained in the ammonia distillate from the stripper 36 low boiling hydrocarbon components of the hydrocarbon solution which were dissolved in the ammonia complex phase.

The ammonia distillate from the stripper 36 is introduced through the pipe 37 into an exchanger 38 wherein it is cooled to about 100° F. with the resulting condensation of entrained hydrocarbons. The cooled distillate is then introduced through a pipe 37 into a separator 40 wherein condensed hydrocarbons are separated from the gaseous ammonia. Condensed hydrocarbons are introduced through a pipe 41 into another stripping vessel 55 whose function will be described more in detail later.

Gaseous ammonia leaves the separator 40 through a pipe 42 and is raised to a pressure of about 500 pounds per square inch in a pump 43. Thereafter ammonia is returned to the mixer 29 through the exchanger 32 and the pipe 31.

Returning to the stripper 36, aldehydes and ammonium salts of organic acids are withdrawn from the lower portion thereof through a pipe 46 and are cooled in an exchanger 47. Aldehydes may be separated from the ammonium salts by azeotropic distillation with steam in a distilling column, not shown. The continuous addition of steam will prevent decomposition of the ammonium salts of the organic acids to amides during the distillation. The ammonium salts may be concentrated from the aqueous residuum of such distillation by the removal of water under vacuum or may be converted to free organic acids, which are water-insoluble since they are of higher molecular weight, by the addition of an inorganic acid.

After separation of the aldehydes from the aqueous portion of the azeotropic distillate, the aldehydes may be fractionated into individual components in a fractionating column, also not shown.

The hydrocarbon solution of non-aldehydic, non-acidic oxygen compounds leaves the settler 34 through a pipe 50 and is introduced into a stripping vessel 55 for the removal of ammonia which is dissolved therein. The stripping vessel 55 is maintained at a temperature of about 250° F. and at atmospheric pressure. The hydrocarbon solution introduced into the stripping vessel 55 may be heat exchanged in an exchanger 51 with the ammonia-free hydrocarbon solution withdrawn from the bottom of the stripper 55.

Under the conditions existing within the stripping vessel 55, the ammonia dissolved in the hydrocarbon phase distills off overhead through a pipe 53. Since there may be lower boiling hydrocarbons entrained within the ammonia distillate, the pipe 53 leads to the previously mentioned exchanger 38 wherein entrained hydrocarbons are condensed. In the separator 40, condensed hydrocarbons are separated from the ammonia stream and are returned to the stripping vessel 55 through a pipe 41. Gaseous ammonia leaves the separator 40 through a pipe 42 and is returned to the mixer 29 through pump 43, exchanger 32 and pipe 31.

The ammonia-free hydrocarbon solution of alcohols, ketones and esters is withdrawn from the stripping vessel 55 through a pipe 54, is heat exchanged with the feed to the stripping vessel 55 in exchanger 51 and issues therefrom through a conduit 56.

The removal of excess ammonia from the hydrocarbon phase is preferably effected in the stripping vessel 55 as has just been described. However, the stripping vessel 55 may be eliminated since the hydrocarbon solution next contacts an aqueous solution of sodium bisulphite whereby excess ammonia is washed from the hydrocarbon solution.

A concentrated aqueous solution of sodium bisulphite, is introduced from a source not shown through a pipe 57 into the conduit 56 where it mixes with the hydrocarbon solution of oxygenated compounds flowing therethrough. About an 80% or higher saturated bisulphite solution is added in sufficient amount to react with the ketones present in the hydrocarbon solution flowing through the conduit 56 and form ketone-bisulphite addition compounds. The resulting mixture containing ketone-bisulphite addition compounds flows into the vessel 67. Ketone-bisulphite compounds separate from the mixture in the vessel 67 and are removed through a pipe 68; they are then subjected to further treatment in order to recover ketones. Treatment with a dilute aqueous acid or dilute aqueous alkali will decompose the ketone-bisulphite addition compounds with the regeneration of ketones which may then be separated from the aqueous solution and fractionated into individual compounds.

The hydrocarbon solution from which the ketones have been separated by treatment with bisulphite leaves the vessel 67 through a pipe 69 and is introduced therethrough into a secondary extraction tower 58. In the secondary extraction tower 58, which is advantageously packed with contact material, the hydrocarbon solution is subjected to extraction with a solvent which is immiscible with hydrocarbons under extraction conditions. Ordinarily the extraction is effected at temperatures in the range of 75 to 125° F. In further description, ethylene glycol will be employed as a solvent but it is contemplated that other glycols, such as polyolefin glycols, aldehydes such as furfural, nitrated hydrocarbons such as nitromethane and amines such as ethanal-amine may be employed.

Ethylene glycol is introduced in to the secondary extraction tower 58 through a pipe 59. The hydrocarbon solution is subjected to countercurrent contact with the glycol solvent as a result of which there are formed a solvent-rich extract phase containing by far the major portion of the alcohols present in the hydrocarbon solution and a hydrocarbon-rich raffinate containing esters.

The hydrocarbon-rich raffinate is withdrawn from the upper portion of the tower 58 through a pipe 60 and is introduced into a scrubber 61 in which it is washed with a small quantity of water, which is introduced into the scrubber 61 through a pipe 62 in the ratio of about one volume of water to about 10 volumes of hydrocarbon so as to remove dissolved glycol from the hydrocarbon solution. The washed hydrocarbons leave the scrubber 61 through a pipe 63.

This hydrocarbon solution which, at this point, contains only esters in any substantial quantity, may be split into two portions. One portion is diverted along a pipe 64 to a pump 65 in which it is raised to a pressure of about 250 pounds per square inch and is thereafter raised to a temperature of about 200° F. in an exchanger 66. This hydrocarbon fraction is then used to extract oxygenated compounds from the aqueous phase initialy separated from the heterogeneous mixture in the extraction tower 13.

Another portion of the hydrocarbon fraction withdrawn from the scrubber 61 is passed to storage through a pipe 64 and thereafter may be used as desired, for example, for motor fuel, etc. As indicated previously, esters may be separated from the hydrocarbon solution by saponification whereby the esters are converted into alcohols and water-soluble salts of organic acids. A water wash removes the salts of organic acids and alcohols may be removed from the hydrocarbon fraction by glycol extraction as just described so that a hydrocarbon fraction can be obtained which is substantially free from oxygenated compounds. The esters may be left in the hydrocarbon fraction if their removal is not dictated by the further use to which the hydrocarbons are to be put.

The solvent-rich extract phase containing alcohols dissolved therein is withdrawn from the extraction tower 58 through a pipe 70 and is introduced into a fractionating tower 71. Therein the lower boiling alcohols, that is, alcohols up to about $C_7$ alcohols whose boiling points are lower than that of ethylene glycol, are distilled from the solvent. Any water which may be present in the glycol extract phase will distill over in the form of the alcohol-water azeotropes of the lower boiling alcohols, for example, ethyl and propyl alcohols. The lower boiling alcohols obtained through the pipe 72 may be separated into individual components by fractionation in a column not shown.

Ethylene glycol containing dissolved therein alcohols of higher molecular weight than $C_7$ is removed from the bottom portion of the fractionating tower 71 through a pipe 72 and is conveyed by a pump 73 to a distilling column 74, There is also introduced into the distilling column 74, the water wash which is removed from the scrubber 61 through a pipe 75. Alcohol-water azeotropes of higher boiling alcohols are steam-distilled from the glycol in the column 74 and the alcohol-water azeotropic distillate is introduced into an exchanger 77 through a pipe 76. After condensation in the exchanger 77, the distillate is introduced into a separator 78 through a pipe 79.

The condensed distillate readily separates into two layers in the separator 78 since higher boiling alcohols are only sparingly soluble in water. Water is withdrawn from the bottom portion of the separator 78 through a pipe 80 and may either be discarded in toto or a portion thereof returned to the distilling column 74 as an azeotrope maker. Higher boiling alcohols are withdrawn from the upper portion of the separator 78 through a pipe 82 and may thereafter be fractionated into individual components.

Ethylene glycol, from which high boiling alcohols have been steam-distilled, is recycled to the secondary extraction tower 58 from the column 74 through a pipe 84.

In the description of the invention, separation of the heterogeneous mixture into an aqueous phase, a hydrocarbon phase and a gas phase has been effected at atmospheric conditions. Where the heterogeneous mixture to be treated by the procedure in the invention is obtained by the catalytic conversion of carbon monoxide and hydrogen—which will be the usual case—the initial separation of the product mixture into an aqueous phase and a liquid hydrocarbon phase is advantageously effected at elevated temperature and under a pressure approximately that prevailing in the synthesis reactor. Separation at elevated temperature reduces the concentration of non-acidic oxygenated compounds in the aqueous phase.

Consequently, the product from a representative synthesis operation directed towards the formation of gasoline hydrocarbons and employing a fluidized unsupported iron catalyst at a temperature of about 550° to 700° F. and at a pressure of about 150 to 300 pounds per square inch is treated as follows: the effluent from the fluidized reactor is cooled to a temperature of about 225° F. without substantial reduction in pressure; at this temperature, the product is separated into an aqueous phase, a liquid hydrocarbon phase and a gas phase; the aqueous phase is subjected to solvent extraction with a hydrocarbon solvent at about 225° F. and pressure of about 250 pounds per square inch so as to effect further extraction of non-acidic oxygenated compounds from the aqueous phase and form a hydrocarbon extract phase and a water-rich phase; the gaseous phase is further cooled to remove higher boiling constituents therefrom and is then recycled at least in part to the synthesis unit; the liquid hydrocarbon phase and the hydrocarbon extract phase are combined; from this point on, treatment is similar to that outlined in the diagram.

It is contemplated that the separation of the products of conversion of synthesis gas into an aqueous phase and a liquid hydrocarbon phase at elevated temperature and pressure may effect such a displacement of the oxygenated compounds form the aqueous phase to the liquid hydrocarbon phase that the subsequent high temperature and pressure extraction step wherein the aqueous phase is extracted with a hydrocarbon solvent may be eliminated. This is particularly true where the synthesis conversion has resulted in the production of a relatively small amount of low boiling oxygenated compounds. In this instance, the liquid hydrocarbon phase, after having been separated from the aqueous phase at elevated temperature and pressure, is directly treated with ammonia under conditions specified previously and from this point on, the treatment is as outlined. Lower boiling alcohols still present in the aqueous phase after high temperature and pressure separation comprise mainly ethyl and propyl alcohols and they may be flashed from the aqueous phase by reducing the pressure; the azeotropes may be directly into the hydrocarbon phase which is to be ammonia-treated or may be fractionated to give individual components.

While the catalytic conversion of synthesis gas directed mainly towards the production of hydrocarbons in the gasoline range has been depicted as the most usual source of the heterogeneous mixture of compounds, it is contemplated that such a heterogeneous mixture may be obtained from a synthesis operation carried out under conditions adapted mainly for the production of oxygen-containing compounds. Synthesis reaction temperatures may range from 150 to 700° F. and pressures from atmospheric to 1,000 pounds or more. Synthesis catalyst may be used in the form of a stationary bed, a moving bed, a fluidized mass or a suspension in the reactants.

While not specifically mentioned, it is contemplated that the countercurrent extraction operations may involve the employement of extract recycle and of suitable temperature gradients through the extraction towers. Temperatures and solvent dosages may vary from those mentioned, while pressures sufficient to maintain substantially liquid phase operation are employed.

It is further contemplated that compounds other than ammonia which contain an amino group and which may be regarded as substituted derivatives of ammonia such as primary amines, hydroxylamine, phenylhydrazine, hydroxy-substituted primary amines such as ethanolamine, nitro-substituted primary amines, etc., may be used to separate carbonyl compounds from the hydrocarbon solution of oxygenated compounds. If an amino group-containing compound forms with the aldehydic and ketonic components of the hydrocarbon solution a compound which is separable from the hydrocarbon solution, it may be used instead of ammonia. The use of such amino group-containing compounds to effect the simultaneous separation of aldehydes and ketones from the hydrocarbon solution is regarded as within the scope of this invention.

Obviously many modifications and variations of the invention, as hereinbefore set forth, may be made without departing from the spirit and scope thereof, and, therefore, only such limitations should be imposed as are indicated in the appended claims.

We claim:

1. In the catalytic conversion of carbon monoxide and hydrogen into a product mixture comprising normally liquid hydrocarbons, water and oxygen-containing organic compounds, such as alcohols, aldehydes, ketones, esters, and acids, the improvement which comprises separating said product mixture into a liquid hydrocarbon-rich phase and a water-rich phase at an elevated temperature between 175 and 300° F. and at a pressure sufficient to maintain substantially liquid phase conditions, subjecting said water-rich phase to counter-current extraction with a hydrocarbon solvent at a temperature of 175 to 300° F. and at a pressure sufficient to maintain substantially liquid phase conditions, combining the extract phase from said extraction with said hydrocarbon-rich phase, subjecting said combined extract and hydrocarbon-rich phases to contact with ammonia at an elevated temperature of about 175 to 300° F. and at a pressure sufficient to maintain substantially liquid phase conditions, thereby forming hydrocarbon-insoluble ammonia complexes and ammonia salts of organic acids, separating a composite comprising said aldehyde-ammonia complexes and said ammonium salts from said combined phases and regenerating aldehydes substantially in monomeric form from said composite.

2. In the catalystic conversion of carbon monoxide and hydrogen into a product mixture comprising normally liquid hydrocarbons, water and oxygen-containing organic compounds, such as alcohols, aldehydes, ketones, esters and acids, the improvement which comprises separating said product mixture into a liquid hydrocarbon-rich phase and a water-rich phase at an elevated temperature between 175 and 300° F. and at a pressure sufficient to maintain substantially liquid phase conditions, subjecting said water-rich phase to counter-current extraction with a hydrocarbon solvent at a temperature of 175 to 300° F. and at a pressure sufficient to maintain substantially liquid phase conditions, combining the extract phase from said extraction with said hydrocarbon-rich phase, subjecting said combined extract and hydrocarbon-rich phases to contact with ammonia at an elevated temperature of about 175 to 300° F. and at a pressure sufficient to maintain substantially liquid phase conditions, thereby forming hydrocarbon-insoluble ammonia complexes and ammonium salts of organic acids, separating a composite comprising said aldehyde-ammonia complexes and said ammonium salts from said combined phases, subjecting said composite to steam distillation whereby aldehyde-ammonia complexes are decomposed and there is obtained a distillate comprising aldehyde-azeotropes and separating said aldehydes from said distillate.

GEORGE B. ARNOLD.
HOWARD V. HESS.

REFERENCES CITED

The following references are of record in the file of this patent:

UNITED STATES PATENTS

| Number | Name | Date |
|---|---|---|
| 432,198 | Guignard | July 15, 1890 |
| 1,704,751 | Luther et al. | Mar. 12, 1929 |
| 1,870,816 | Lewis | Aug. 9, 1932 |
| 1,987,601 | Burke | Jan. 15, 1935 |
| 2,274,750 | Soenksen et al. | Mar. 3, 1942 |
| 2,410,642 | Farkas | Nov. 5, 1946 |
| 2,476,788 | White | July 19, 1949 |

FOREIGN PATENTS

| Number | Country | Date |
|---|---|---|
| 697,756 | Germany | Oct. 22, 1940 |

OTHER REFERENCES

Richter, Organic Chemistry, published by Blakistons' Son & Co., Philadelphia (1921), pages 195, 220.

Fischer, Conversion of Coal Into Oil, published by Ernest Benn Ltd., London (1925), pages 241-6.